3,769,370
COMPOSITION OF POLYOLEFIN RUBBER, 1,2-POLYBUTADIENE AND A FLUORINATED POLYMER

Jon W. Martin, Los Alamitos, and Jeffrey L. Bell, Anaheim, Calif., assignors to TRW Inc., Redondo Beach, Calif.
No Drawing. Filed June 14, 1971, Ser. No. 153,022
Int. Cl. C08d 9/16
U.S. Cl. 260—889
7 Claims

ABSTRACT OF THE DISCLOSURE

A blend of a polyolefin rubber, a low molecular weight 1,2-butadiene resin, a polyfluorinated resin and, if desired, an inert filler, such as silica, carbon black, alumina, etc., is peroxide cured to produce a vulcanized elastomer having high tensile strength and elongation properties for use in corrosive environments, such as hydrazine, oil wells, etc.

BACKGROUND OF THE INVENTION

This invention relates to new and improved elastomer compositions and more specifically to the cured blend of a polyolefin rubber containing a low molecular weight 1,2-polybutadiene resin, a particulate fluorinated polymer and, if desired, inert filler. Curing of the blend produces an elastomer compound which may be employed as a sealant. The elastomers are also useful as electrical cable jackets having improved tensile and elongation properties when employed in corrosive environments, such as found in oil wells.

When employed in a corrosive environment, the use of elastomer compounds for sealants or insulators require that the elastomers have suitable mechanical as well as electrical properties. Swelling and tensile tear represent the mechanical properties of greatest interest; these properties should not change markedly during or following exposure to the corrosive environment when the elastomer is under stress.

Further, the elastomer must be chemically inert to the environment and hence, no interaction between these two should occur.

When employed in the corrosive environment of an oil well, tensile strength and swelling are the two most important mechanical properties which should be maintained. As in the case with a hydrazine environment, the elastomers should be reasonably chemically resistant to the components generally found in oil wells.

It is, therefore, an object of this invention to provide an elastomer suitable for use in corrosive environments, such as hydrazine, oil wells, etc.

Another object is to provide an elastomer produced by the peroxide curing of a blend containing a polyolefin rubber, cured particles from a liquid 1,2-polybutadiene resin, a particulate fluorinated polymer, and a filler, such as carbon black, silica, and alumina.

Other objects of the invention will be disclosed from the description to follow.

THE INVENTION

According to the invention, a new elastomer composition for use in corrosive environments is produced by blending together a polyolefin rubber-based polymer, a liquid 1,2-polybutadiene resin, a fluorinated polymer, and a filler, and then curing the blend with a peroxide catalyst.

Preferred fillers, such as silica, alumina, or carbon black, can be incorporated into the blend to obtain certain desired mechanical properties. These fillers are selected specifically for the environment to be encountered.

Broad concentrated limits of the components in the elastomer are as follows: polyolefin rubber 30% to 95%; a liquid derived 1,2-polybutadiene resin 1% to 25%; fluorinated polymer 1% to 20%; and filler 0% to 50%, all parts by weight.

Preferred concentration limits of the components are as follows: polyolefin rubber 45% to 75%; a liquid derived 1,2-polybutadiene resin 5% to 15%; fluorinated polymer 1% to 15%; and filler 20% to 40%, all parts by weight.

In the preferred embodiment of the invention, ethylene/propylene copolymers (E/P) or ethylene/propylene/diene terpolymers (EPDM) are employed as the polyolefin rubber, and a polybutadiene resin of about 3000 molecular weight and high in butadiene units of 1,2-configuration is incorporated therein. The butadiene resin renders the cured product resistant to elution and intrusion by many corrosive chemical agents such as hydrazine and liquid or gaseous components of oil wells. In a hydrazine environment, it is preferred to employ silicon dioxide as the filler.

Preferably, a peroxide is employed as the cure catalyst. Preferably, the fluorinated polymer is polytetrafluoroethylene.

Typical polyolefin rubbers which may be employed in this invention include:

ethylene/propylene copolymers,
ethylene/propylene/diene terpolymers,
isobutylene/isoprene copolymers,
isoprene homopolymers,
isoprene/acrylonitrile copolymers,
butadiene homopolymers,
butadiene/acrylonitrile copolymers,
isobutylene homopolymers, and
styrene/butadiene copolymers.

A typical EPDM which may be employed in this invention is an amorphous material sold by the E. I. du Pont de Nemours and Co. Ltd., under the trade name of Nordel 1040. This material has a high molecular weight as shown by its Mooney viscosity value (ML at 250° F.) of 40. A correlation of glass transition temperature with ethylene/propylene ratio is reported by J. J. Maurer in Rubber Chem. and Technology 38, 979, (1965). This indicates the Nordel 1040 polymer contains about 25–30 mole-percent propylene, about 70–75 mole-percent ethylene and 1–2 mole-percent unconjugated diene. Several unconjugated dienes may be used to form this type of terpolymer including dicyclopentadiene, methylene norbornene, ethylidene norbornene and 1,4-hexadiene. Analytical data reported by K. Kiyimoto and S. Nakade in J. Appl. Polymer Science, 14, 1509, (1969), established that Nordel 1040 contains 1,4-hexadiene as the termonomer. To ensure that the Nordel 1040 contained no hydrazine reactive material, it was successively extracted with boiling methyl alcohol and boiling methyl ethyl ketone. It was dried of solvent under vacuum and a small amount of antioxidant, Ionol was added by mixing on a two-roll rubber mill. Ionol is 2,6-di-tert-butyl-4-methyl phenol and is sold by the Shell Chemical Co.

A typical polybutadiene resin which may be used is sold by the Hystl Development Co. under the trade name of B-3000, and is produced by the conventional ionic polymerization of 1,3-butadiene. The B-3000 resin contains a minimum of about 80% butadiene units in the vinyl configuration and about 6% minimum of the unsaturated butadiene units in the transconfiguration. It has a number average molecular weight of 3000±300 as determined by a Hewlett-Packard Vapor Pressure Osmometer (Model 302) which has been calibrated using pure benzil as a standard.

If desired, liquid polybutadienes which are employed may be chain-terminated by reactive groups such as hydroxyl, epoxides, amides, etc. Examples of liquid 1,2-polybutadienes which have these chain-terminating groups are disclosed in Pat. No. 3,431,235. However, the chain-terminated form of the 1,2-polybutadienes does not appear to confer any particular advantage to the final product; hence, the preferred form of the liquid 1,2-polybutadienes simply employs hydrogen at the ends of the molecule rather than containing reactive chain-terminating groups.

Fluorinated polymers which may be employed in the blend include polytetrafluoroethylene, copolymers and mixtures thereof, polychlorotrifluoroethylene (KEL-F), polyvinyl fluoride, polyvinylidene fluoride (KYNAR), copolymers of vinylidene fluoride and hexafluoropropylene (VITON), polyperfluorobutadiene, etc.

To impart suitable properties to the elastomeric compound, the fluorinated polymer should have cold flow properties and possess a higher compression modulus than the host elastomer. This permits the fluorinated polymer to be dispersed into and function as a reinforcing agent in the elastomer. The fluorinated polymer is preferably incorporated into the host polyolefin rubber in the form of small particles, a preferred average particle size varying from about 35 to about 350 microns; higher particles may also be used.

The optimum properties of the elastomer result when the polybutadiene resin particles have a maximum size of about 0.5–1.0 micron in diameter and are thoroughly dispersed throughout the polyolefin rubber matrix. The preferred size range is produced when the polybutadiene content varies from about 10% to about 40% by weight of the total composition.

The preferred number average molecular weight range of the polybutadiene varies from about 500–10,000 as measured by the Hewlett-Packard device.

A suitable silicon dioxide filler is sold by the Godfrey Cabot Corp. under the trade name of Cab-O-Sil M-5. This material contains more than 99% by weight amorphous silicon dioxide of nominal 12 millimicron particle size and 200±25 m.²/gm. surface area; it is prepared by the high temperature hydrolysis of silicon tetrachloride.

While many peroxide catalysts will provide the desired results, it is preferred to employ peroxides which have measured half-lives (in benzene solution) at 300° F. of between one second and thirty minutes. An example of such a peroxide is dicumyl peroxide sold by the Hercules Powder Co. as Di-Cup R. This catalyst contains about 98% active dicumyl peroxide and has a measured half-life in benzene solution at 300° F. of about 5 minutes. This catalyst generates a curing reaction by the formation of free radicals on the rubber polymer backbone and on the butadiene resin polymer chain.

Lupersol 101, manufactured by the Pennwalt Chemical Co., Lucidol Division, is also suitable. This catalyst has the formula: 2,5 - dimethyl - 2,5 - bis-(t-butyl peroxy)-hexane.

Other preferred catalysts which may be employed should have a suitable half-life at the temperature employed for curing to take place during a reasonable reaction time. Especially suitable are those catalysts of the organic peroxy type such as: di-t-butyl peroxide, 2,5-dimethyl-2,5-bis(t-butylperoxy) hexane, n-butyl-4,4 - bis(t-butylperoxy) valerate, 2,5 - dimethyl-2,5-bis(t-butylperoxy) hexyne-3, t-butyl perbenzoate, dicumyl peroxide, methyl ethyl ketone peroxide, cumene hydroperoxide, di-N-methyl-t-butyl percarbamate, lauroyl peroxide, acetyl peroxide, decanoyl peroxide, t-butyl peroxyisobutyrate, and t-butylperpivalate.

In order to cure the composition, the components are blended together and then heated for a suitable time and temperature in a closed system. The times and temperatures of the curing reaction are determined by the half-life time of the catalyst at the curing temperature; usually, 5–10 of these half-lives are used which reduces the residual active peroxide content to between 3.125% and 0.098% of the concentration originally added. Cure times may vary from about 5 minutes to 90 minutes while cure temperatures may vary from about 300° F. to 400° F. To purge volatiles from the cured composition, a post cure such as 350° F. for 30 minutes may be employed; oven post cure times of about 2 hours at about 225° F. are also effective for this purpose.

Blending of the components is accomplished using standard rubber technology; this permits the use of roll mills, Banbury mixers, etc., to blend the components. When a 2-roll rubber mill is employed, a suitable surface speed ratio between the rolls is 1.25:1. The elastomer and resin components are blended together followed by the auxiliary filler and then the cure catalyst.

In Table 1, Compounds 1 and 2 show the effect of the individual components upon the mechanical properties of the elastomer following exposure to a corrosive environment, such as found in oil wells. The sole difference between the two compositions is that Compound 2 contains 5 parts by weight of polytetrafluoroethylene (TFE) resin. Compounds 1 and 2 were immersed for 100 hours at 350° F. in a 50–50 solution of crude oil and salt water, which also contained by weight 3% $H_2S$, ½% $H_2SO_4$, ½% surfactant, and 3% pentane. Both formulations were cured for 15 minutes at 325° F. before being exposed to the oil well environment.

TABLE 1.—FORMULATIONS OF COMPOUNDS

| | Parts by weight | |
|---|---|---|
| | Compound 1 | Compound 2 |
| Nordel 1040 | 100 | 100 |
| Polytetrafluoroethylene resin | 0 | 5 |
| B-300 | 15 | 15 |
| ISAF [1] | 30 | 30 |
| Mistron Vapor [2] | 30 | 30 |
| Lupersol 101 [3] | 2 | 3 |
| ZnO [4] | 5 | 5 |
| Total parts | 183 | 188 |

[1] Furnace carbon black [ASTM D-2516 (N220)], United Carbon Co.
[2] Magnesium silicate, Cyprus Mines, United Sierra Division.
[3] 2,5-dimethyl-2,5-bis-(t-butyl peroxy)-hexane, Pennwalt Chemical Co., Lucidol Division.
[4] Zinc oxide, Baker reagent grade.

| | Compound 1 | | Compound 2 | |
|---|---|---|---|---|
| | A | B | C | D |
| $M_{100}$ (p.s.i.) [ASTM D412-64T] | 1,350 | 950 | 2,250 | 1,725 |
| $T_8$ (p.s.i.) [ASTM D412-64T] tensile strength at break | 2,350 | 1,050 | 2,500 | 1,725 |
| $E_B$ (percent) [ASTM D412-64T] elongation at break | 160 | 110 | 110 | 100 |
| Tensile set (percent) [ASTM D4212-64T] | 12 | 2 | 10 | 2 |
| Shore A hardness [ASTM D2240-64T] | 85 | 72 | 92 | 83 |
| Tear (p.l.i.) [ASTM D624-54, DIE-B] | 115 | 215 | 300 | 240 |
| Δ vol. [ASTM D1460-60], percent | | 56 | | 44 |

NOTE.—A and C columns show original properties (as molded). B and D columns show properties measured after exposure to an oil well environment for 100 hours at 350° F.

It will be observed that the tensile strength ($T_b$) of Compound 1 was reduced by 55% due to the oil exposure while that of Compound 2 was reduced by only 31%, a 24% difference. In Compound 1, elongation at break ($E_b$) was reduced by 31.3%, whereas that of Compound 2 was reduced by only 9.1%; this represents a 22% difference. Obviously, Compound 2 containing polytetrafluoroethylene resin exhibited far superior retention of mechanical properties in terms of tensile strength and elongation at break than did Compound 1 when exposed to the corrosive oil well medium.

Table 2 illustrates the effect of adding liquid polybutadiene resin high in 1,2-structure and polytetrafluoroethylene separately and together to an ethylene propylene terpolymer.

TABLE 2

|  | 3 | 4 | 5 | 6 |
|---|---|---|---|---|
| Component, parts by weight: |  |  |  |  |
| EPT, Nordel 1040 | 100 | 100 | 100 | 100 |
| B-3000 resin [1] |  | 20 |  | 20 |
| Polytetrafluoroethylene resin powder [2] |  |  | 35 | 35 |
| Di-Cup R [3] | 4 | 4 | 4 | 5 |
| Total parts | 104 | 124 | 139 | 160 |
| Cured, min. at 350° F | 30 | 30 | 30 | 30 |
| Tensile strength, p.s.i. | 150 | 940 | 430 | 900 |
| Nicked crescent tear, p.l.i. | <10 | <10 | 165 | 200 |

[1] Liquid polybutadiene resin containing a nominal 90% of 1,2-microstructure, HYSTL Development Co.
[2] T-5B resin, Fluorocarbon Corp.
[3] Dicumyl peroxide, Hercules Powder Co.

It will be observed that Compound 3, containing only the cured ethylene propylene terpolymer, has a very low tensile strength and tear strength. In Compound 4, addition of only the liquid 1,2-polybutadiene resin improves the tensile strength; however, no improvement in tear strength is obtained. In Compound 5, addition of only polytetrafluoroethylene resin to the ethylene propylene terpolymer improves both the tensile and the tear strength. In Compound 6, a composition of the present invention, addition of both polybutadiene and polytetrafluoroethylene to the ethylene propylene terpolymer results in an elastomer whose tensile and tear properties are significantly higher than what might be expected from averaging the properties of Compounds 4 and 5. Compound 6 may be employed as a sealant (e.g., O-ring, face seal, valve seat, etc.) in corrosive chemical environments such as hydrazine at temperatures up to 350° F.

When employed as a cable covering material, there are additional advantages which are inherent in blends of ethylene-propylene-terpolymer, polybutadiene and polytetrafluoroethylene. These include excellent electrical properties, low permeability to polar (electrically conducting) molecules, high tensile strength, high abrasion resistance, ease of extrusion, good mold flow, etc.

In Table 3, the effect of using carbon black in an ethylene propylene terpolymer matrix along with polybutadiene is shown as it effects tensile strength, hardness and tear strength. The effect on the tear strength when carbon black is replaced by polytetrafluoroethylene is shown in Example 9, an elastomeric composition of this invention. The composition of Example 9 may be employed as a sealant or bladder for service in corrosive chemical environments, but preferably those which will not react with commercial grades of carbon black, such as in hydrazine.

In Example 10 (another elastomer of this invention), the effect of employing silica instead of carbon black is shown. Here the tensile property is greatly improved while still maintaining tear strength and hardness. As in Table 1, the ASTM designations are the same.

The elastomer of Example 10 may be employed as a bladder material for hydrazine service.

TABLE 3

|  | 7 | 8 | 9 | 10 |
|---|---|---|---|---|
| Component, parts by weight: |  |  |  |  |
| EPT, Nordel 1040 | 100 | 100.0 | 100.0 | 100 |
| Filler |  | [1] 30.0 |  | [6] 30 |
| Polytetrafluoroethylene resin [2] |  |  | 40.0 | 20 |
| B-3000 Resin [3] |  | 20.0 | 10.0 | 10 |
| Zinc oxide [4] |  | 5.0 | 5.0 | 5 |
| Sulfur |  | 0.3 | 0.3 |  |
| Peroxide | [5] 4 | [5] 6.0 | [5] 5.0 | [7] 4 |
| Total parts | 104 | 161.3 | 160.3 | 169 |
| Press cure, min. at 350° F | 30 | 30 | 30 | 30 |
| Air oven post cure, hrs. at 225° F | 2 | 2 | 2 | 2 |
| Tensile at break, p.s.i. | 150 | 1,300 | 1,000 | 1,900 |
| Shore A hardness | 40 | 55 | 85 | 88 |
| Tear strength, p.l.i. | <10 |  | 365 | 275 |

[1] Furnace carbon black, Cabot Corp.
[2] T-5B, Fluorocarbon Corp.
[3] Liquid polybutadiene resin of nominal 90% 1,2-microstructure, HYSTL Development Co.
[4] Baker reagent grade.
[5] Dicumyl peroxide, Hercules Powder Co.
[6] Cab-O-Sil ST-1 (Godfrey Cabot Corp.; a hydrophobic grade of fumed $SiO_2$ made by high temperature hydrolysis of silicon tetrachloride followed by a silane reaction to form methyl groups on the surface of the silica particles).
[7] Lupersol 101.

Accordingly, it will be seen that the compositions of the present invention provide unexpectedly good physical properties than would be expected from the individual components.

Furthermore, the blends can be easily processed in terms of low friction coefficients, ease of processing, good mold flow, etc.

Finally, the blends have a high degree of corrosion resistance which may be tailored for different environments by varying the components, particularly the inert filler.

What is claimed is:

1. A peroxide cured elastomeric composition comprising the following:
    a polyolefin rubber matrix: 30% to 95%, said rubber selected from the class consisting of ethylene/propylene copolymers, ethylene/propylene/dieneterpolymers, butadiene homopolymers, butadiene/acrylonitrile copolymers, and styrene/butadiene copolymers;
    a liquid-derived 1,2-polybutadiene resin: 1% to 25%, containing a minimum of 80% butadiene units in the vinyl configuration;
    a fluorinated polymer: 1% to 20%; said polymer selected from the class consisting of polytetrafluoroethylene, copolymers of tetrafluoroethylene and mixtures thereof, and polychlorotrifluoroethylene; and filler: 0% to 50%, all parts by weight.

2. A peroxide cured elastomeric composition comprising the following:
    a polyolefin rubber matrix: 30% to 95%, said rubber selected from the class consisting of ethylene/propylene copolymers, ethylene/propylene/diene terpolymers, butadiene homopolymers, butadiene/acrylonitrile copolymers, and styrene butadiene copolymers;
    a liquid-derived 1,2-polybutadiene resin: 1% to 25% containing a minimum of 80% butadiene units in the vinyl configuration and about 6% minimum of the unsaturated butadiene units in the trans configuration;
    a fluorinated polymer: 1% to 20%, said polymer selected from the class consisting of polytetrafluoroethylene, copolymers of tetrafluoroethylene and mixtures thereof, and polychlorotrifluoroethylene; and filler: 0% to 50%, all parts by weight.

3. A peroxide cured elastomeric composition comprising the following:
    a polyolefin rubber matrix: 45% to 75%, said rubber selected from the class consisting of ethylene/propylene copolymers, ethylene/propylene/diene terpolymers, butadiene homopolymers, butadiene/acrylonitrile copolymers, and styrene/butadiene copolymers;
    a liquid-derived 1,2-polybutadiene resin: 5% to 15%, containing a minimum of 80% butadiene units in the vinyl configuration;

a fluorinated polymer: 1% to 15%, said polymer selected from the class consisting of polytetrafluoroethylene, copolymers of tetrafluoroethylene and mixtures thereof, and polychlorotrifluoroethylene; and filler: 20% to 40%, all parts by weight.

4. A peroxide cured elastomeric composition comprising the following:

a polyolefin rubber matrix: 45% to 75%, said rubber selected from the class consisting of ethylene/propylene copolymers, ethylene/propylene/diene terpolymers, butadiene homopolymers, butadiene/acrylonitrile copolymers, and styrene/butadiene copolymers;

a liquid-derived 1,2-polybutadiene resin: 5% to 15%, containing a minimum of 80% butadiene units in the vinyl configuration and about 6% minimum of the unsaturated butadiene units in the trans configuration;

a fluorinated polymer: 1% to 15%, said polymer selected from the class consisting of polytetrafluoroethylene, copolymers of tetrafluoroethylene and mixtures thereof, and polychlorotrifluoroethylene; and filler: 20% to 40%, all parts by weight.

5. A peroxide cured elastomeric composition comprising the following:

a polyolefin rubber containing about 25-30 mole percent propylene, about 70-75 mole percent ethylene and 1-2 mole percent unconjugated diene: 45% to 75%;

a liquid derived 1,2-polybutadiene containing a minimum of about 84% butadiene units in the vinyl configuration and about 6% minimum of the unsaturated butadiene units in the trans configuration: 5% to 15%;

polytetrafluoroethylene: 1% to 15%; and filler: 30% to 40%, all parts by weight.

6. The composition of claim 5 in which the said diene is selected from the class consisting of: dicyclopentadiene, methylene norbornene, ethylidene norbornene, and 1,4-hexadiene.

7. The composition of claim 6 in which the number average molecular weight of the liquid polybutadiene varies from 500–10,000.

References Cited

UNITED STATES PATENTS

| | | | |
|---|---|---|---|
| 3,519,703 | 7/1970 | Merkl et al. | 260—897 |
| 2,832,748 | 4/1958 | Safford et al. | 260—889 |
| 3,630,974 | 12/1971 | Ladocsi et al. | 260—5 |

J. SEIBERT, Assistant Examiner

MURRAY TILLMAN, Primary Examiner

U.S. Cl. X.R.

260—41.5 R, 41.5 A, 890